US008654485B1

(12) United States Patent
Koehler

(10) Patent No.: US 8,654,485 B1
(45) Date of Patent: Feb. 18, 2014

(54) ELECTRONIC BALLAST WITH PROTECTED ANALOG DIMMING CONTROL INTERFACE

(75) Inventor: James Koehler, Pflugerville, TX (US)

(73) Assignee: Universal Lighting Technologies, Inc., Madison, AL (US)

( * ) Notice: Subject to any disclaimer, the term of this patent is extended or adjusted under 35 U.S.C. 154(b) by 263 days.

(21) Appl. No.: 13/076,888

(22) Filed: Mar. 31, 2011

(51) Int. Cl.

| | |
|---|---|
| ***H02H 7/00*** | (2006.01) |
| ***H02H 9/00*** | (2006.01) |
| *H02H 3/20* | (2006.01) |
| *H02H 9/04* | (2006.01) |
| *H05B 37/00* | (2006.01) |
| *H05B 37/02* | (2006.01) |

(52) U.S. Cl.
USPC .......... 361/18; 361/91.1; 361/91.4; 361/91.5; 315/219; 315/291

(58) Field of Classification Search
USPC .......................................... 361/18, 91.1, 91.5
See application file for complete search history.

(56) References Cited

U.S. PATENT DOCUMENTS 6,144,539 A 11/2000 Konopka et al.
6,204,613 B1 3/2001 Hesterman
6,356,027 B1 3/2002 Zhang et al.
7,333,353 B2 * 2/2008 Yin et al. ........................ 363/49
7,750,577 B2 7/2010 Nerone et al.
2010/0102747 A1 4/2010 Ilyes et al.
2010/0181935 A1 7/2010 Wu

* cited by examiner

*Primary Examiner* — Jared Fureman
*Assistant Examiner* — Lucy Thomas
(74) *Attorney, Agent, or Firm* — Waddey Patterson; Mark J. Patterson; Gary L. Montle

(57) ABSTRACT

A control signal interface circuit includes a line voltage protection circuit coupled to first and second input terminals. The protection circuit provides an input DC voltage across the input terminals within a predetermined range (i.e., 0-10 Vdc) and prevents the application of an input line voltage (i.e., 347 Vac) across the input terminals. A first current source circuit is coupled to the protection circuit, an isolation circuit is coupled to the first current source circuit and a second current source circuit is coupled to the isolation circuit. The first and second current source circuits collectively provide a linear output DC voltage with respect to the input DC voltage. At least one of the first and second current source circuits include circuitry wherein the linear conversion of the input DC voltage to the output DC voltage is independent of the temperature.

18 Claims, 6 Drawing Sheets

ELECTRONIC BALLAST WITH PROTECTED ANALOG DIMMING CONTROL INTERFACE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

The present invention relates generally to analog signal isolation circuits. More particularly, the present invention relates to control signal interface circuits for providing galvanic isolation and protection against line voltage application across analog control signal input terminals, such as for use with electronic ballasts.

Generally speaking, a control signal interface circuit is designed for connection to an external source such as a DC control voltage, while an associated electronic ballast is designed for connection to a mains AC power source. A conventional control signal interface circuit may be designed to deliver a small current, with a DC control voltage obtained from a variable resistor, shunt regulator, light-level controller, etc. Shunt regulators for example may control electronic ballasts by setting the voltage across the control input terminals to a predetermined voltage range, wherein upon disconnection of the shunt regulator from the control interface the open-circuit voltage across the control terminals rises to approximately the upper end of the range.

In designing for these connections, electronic ballasts and associated interface circuitry usually include a pair of control signal input terminals for connection to the DC control voltage and a pair of mains AC power input terminals for connection to the external mains power source. However, an all-too common problem during the installation of electronic ballasts is where control signal input terminals of the ballast are inadvertently coupled to a mains line input source. Such an error may result in a great deal of damage to interface circuitry within the electronic ballast. Further, where a single interface circuit may be provided for a plurality of electronic ballasts, such damage may extend to an array of ballasts and multiply the costs of replacement accordingly.

Protection circuits have previously been provided and are known in the art for protecting the control interface circuitry in electronic ballasts against line voltages. In response to the application of line voltages, high impedance is provided to limit current in the protection circuit and clamping circuitry may be further provided to limit the output voltage from the protection circuit to the interface circuitry and the remainder of the electronic ballast generally. However, such circuits typically also utilize PTC thermistors or high voltage transistors to provide such protection, which increases the cost of the circuit.

It would be desirable to provide a relatively low cost interface circuit with sufficient protection against the application of line voltages.

BRIEF SUMMARY OF THE INVENTION

Various embodiments of an interface circuit in accordance with the present invention may generally provide galvanic isolation between input and output terminals while further providing immunity to application of line voltages across the input terminals.

In certain embodiments, linear conversion of a control voltage applied to the input terminals may be provided independently of temperature.

In certain embodiments, an interface circuit in accordance with the present invention may allow for the use of passive controls and multiple electronic ballasts.

In certain embodiments, an interface circuit in accordance with the present invention is capable of operating as a data port for limited data communication between an external source and the one or more electronic ballasts.

In certain embodiments, an interface circuit in accordance with the present invention may be used as a generic analog signal isolator or conditioner with respect to various applications other than lighting.

In a particular embodiment, an interface circuit in accordance with the present invention includes a line voltage protection circuit coupled to first and second input terminals. The protection circuit conducts an input DC voltage across the input terminals within a predetermined range (i.e., 0-10 Vdc) and limits the conduction of an input line voltage (i.e., 347 Vac) across the input terminals. A first current source circuit is coupled to the protection circuit, an isolation circuit is coupled to the first current source circuit and a second current source circuit is coupled to the isolation circuit. The first and second current source circuits collectively provide a linear output DC voltage with respect to the input DC voltage. At least one of the first and second current source circuits include circuitry wherein the linear conversion of the input DC voltage to the output DC voltage is independent of the temperature.

In another particular embodiment, an interface circuit in accordance with the present invention includes first and second input terminals, with a plurality of resistors coupled in series to the first input terminal and effective to protect against line voltages applied across the input terminals during a first half-cycle, and a diode having its cathode coupled to the second input terminal and effective to protect against line voltages applied across the input terminals during a second half-cycle. The plurality of resistors and the diode collectively conduct an input DC voltage applied across the input terminals within a predetermined range. A first current source circuit is coupled to the resistors and the anode of the diode. A flyback converter circuit includes an input drive stage, an output stage and an isolation transformer having a first winding coupled to the first current source circuit, a second winding coupled to the output stage, and a third winding coupled to the input drive stage. The isolation transformer is effective to provide galvanic isolation between the first current source circuit, the input drive stage and the output stage. A second current source circuit is coupled to the output stage of the flyback converter circuit, and the first and second current source circuits collectively provide a linear output DC voltage with respect to the input DC voltage.

In yet another particular embodiment, a dimming control signal interface circuit in accordance with the present invention is provided for an electronic ballast. A line voltage protection circuit is coupled to first and second input terminals and conducts an input dimming control voltage applied across the first and second input terminals, and further prevents the conduction of an input line voltage applied across the first and second input terminals. A first current source circuit is coupled to the protection circuit, an isolation circuit is coupled to the first current source circuit and a second current source circuit is coupled to the isolation circuit. The first and second current source circuits collectively provide a linear output dimming control voltage with respect to the input voltage. A self-oscillating drive circuit is further provided to drive the interface circuit.

DETAILED DESCRIPTION OF THE INVENTION

Figure 1:
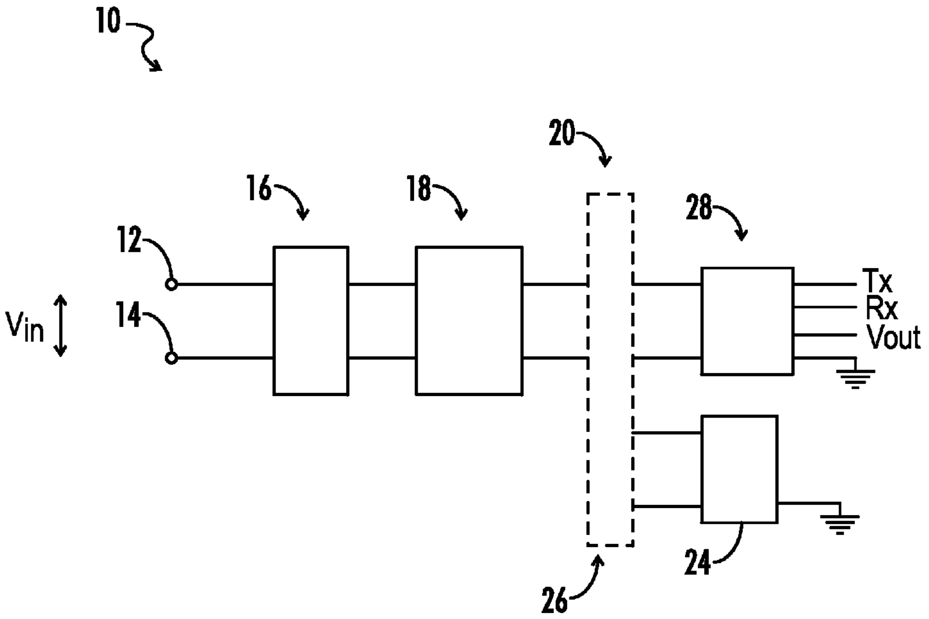
FIG. 1 is a circuit block diagram representing an embodiment of the interface circuit of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-6, various embodiments of an interface circuit may be described herein for providing galvanic isolation and line voltage protection. Where the various figures may describe embodiments sharing various common elements and features with other embodiments, similar elements and features are given the same reference numerals and redundant description thereof may be omitted below.

In various embodiments as described herein, the interface circuit may generally be applied as an analog interface (typically 0 to 10 Vdc) for electronic ballasts. Alternative embodiments of the interface circuit may within the scope of the present invention be used as a generic analog signal isolator or conditioner for applications other than lighting.

Referring first to FIG. 1, an embodiment of an interface circuit 10 in accordance with the present invention includes first and second input terminals 12, 14 across which an input voltage may be received from an external source. A protection circuit 16 is coupled to the first and second input terminals 12, 14, and may generally be effective to allow an input voltage to be supplied to the remainder of the interface circuit 10 when the input voltage is within a predetermined acceptable input range (e.g., 0 to 10 Vdc), and further effective to prevent the input voltage from being supplied to the remainder of the interface circuit 10 when the input voltage is outside of the predetermined range (e.g., a line voltage having been inadvertently applied to the input terminals, for example of about 347 Vac).

A first current source circuit 18 is coupled to the protection circuit 16. In various embodiments the first current source circuit 18 may be configured to provide a fixed current output and further provide a fixed voltage offset with respect to the received voltage input.

An isolation circuit 26 is coupled to the first current source circuit 18 and is effective to provide galvanic isolation between the first current source circuit 18 and an output stage of the interface circuit 10. In an embodiment as shown in FIG. 1, the isolation circuit 26 includes a transformer 20 having a first winding **20*a* coupled to the first current source circuit 18**.

A second current source circuit 28 is coupled to a second winding **20*b* of the transformer 20 of the isolation circuit 26. In various embodiments the second current source circuit 28 may be configured to cancel out the fixed voltage offset provided by the first current source circuit 18, resulting in an output voltage (Vout) being provided by the second current source circuit 28 which linearly tracks the input voltage (Vin) applied across the input terminals 12, 14**.

A drive circuit 24 is coupled to a third winding **20*c* of the transformer 20 of the isolation circuit 26. The drive circuit 24 may be configured in response to external drive signals to provide a limited amount of power to components of the first current source circuit 18 and reflect the input voltage and the fixed voltage offset added by the first current source circuit 18 to the second current source circuit 28**.

Figure 2:
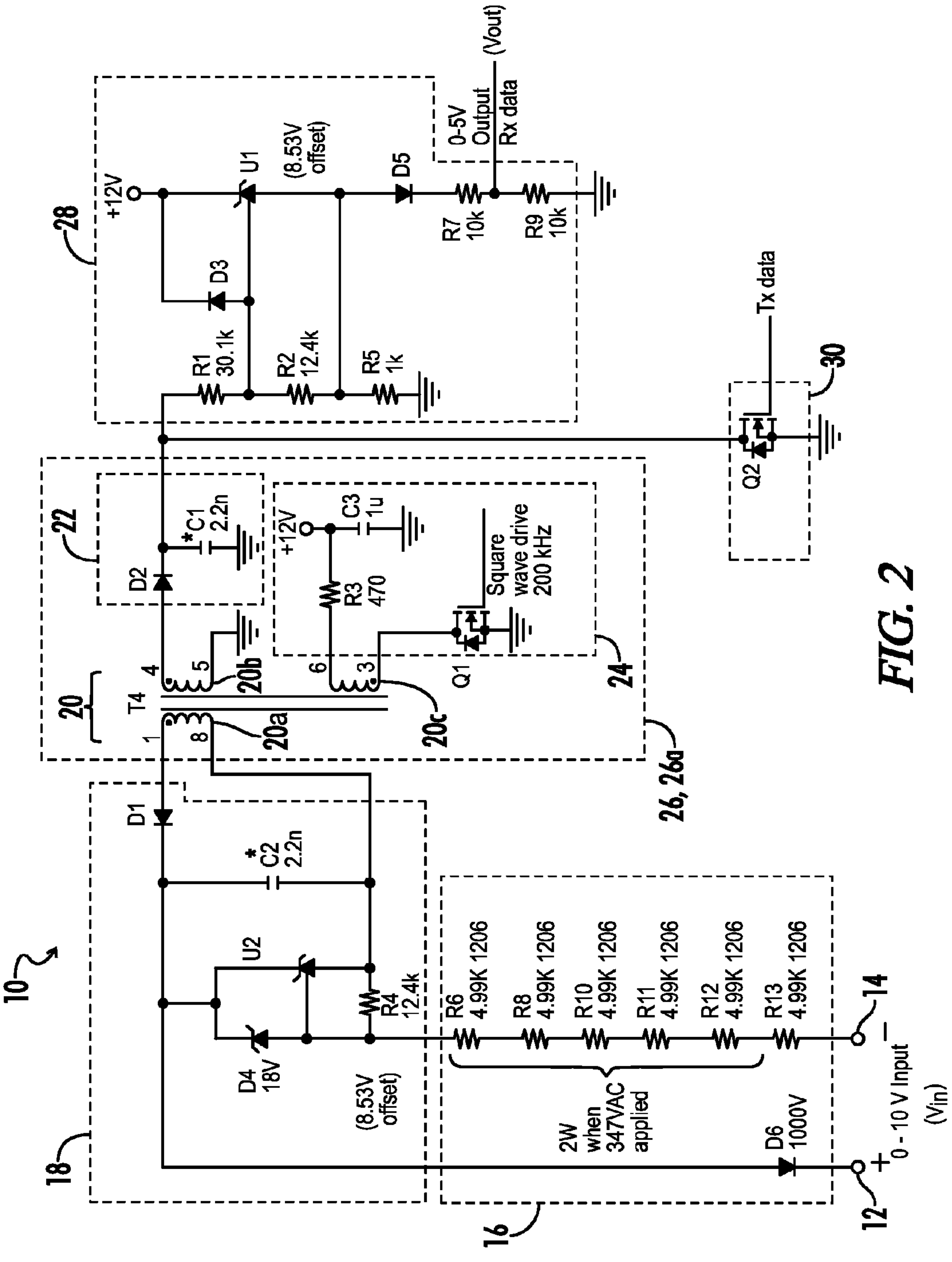
FIG. 2 is a circuit diagram representing a detailed view of an embodiment of the interface circuit in accordance with FIG. 1.

In various embodiments, such as the example represented in FIG. 2, the drive circuit 24 may include a first switching element Q1 that, with the third winding **20*c* of the transformer 20, defines an input drive stage of a flyback converter circuit 26*a* as the isolation circuit 26. The switching element Q1 may be, for example, a MOSFET which is opened and closed via a square wave drive signal provided to its gate, with its source coupled to ground and its drain coupled to the third winding 20*c*. The second current source circuit 28 may include a diode D2 and capacitor C1 coupled to the second winding 20*b* of the transformer 20 which collectively define an output stage 22 of the flyback converter circuit 26*a*, providing the voltage to the second current source circuit 28 which reflects the input voltage and the fixed voltage offset added by the first current source circuit 18**.

Alternatively stated, in such embodiments a flyback converter circuit **26*a* is defined by the switching element Q1, the various windings 20*a*, 20*b*, 20*c* of the isolation transformer 20, and an output stage 22 including output circuitry D2, C1, with the first current source circuit 18 coupled to the flyback converter circuit 26***a* via the first winding 20*a* and the second current source circuit 28 coupled to the flyback converter circuit 26*a* via the output circuitry D2, C1.

In various embodiments communications circuitry 30 may be coupled to the second current source circuit 28 for sending and receiving data signals Rx, Tx via the interface circuit 10 and across the input terminals 12, 14. The interface circuit 10 may in such embodiments be effective thereby to operate as a data port for configuring an electronic ballast as is known in the art.

As shown in FIG. 2, the communications circuitry 30 may include a second switching element Q2 such as, for example, a MOSFET having a gate coupled to a Tx data communications source, a source coupled to ground, and a drain coupled to a node between the output stage/output circuitry 22 of the flyback converter 26*a* and the second current source circuit 28. A node as represented between resistors R7, R9 in FIG. 2 may provide the output voltage Vout with respect to ground and further provide an Rx data communications node, wherein no additional communications circuitry is required.

Still referring to FIG. 2, the protection circuit 16 may include a diode D6 having its cathode coupled to the first input terminal 12 (+) and its anode coupled to the first current source circuit 18 to provide protection against the application of line voltages in one half cycle. The protection circuit 16 may further include a resistive network as represented by resistors R6, R8, R10, R11, R12, R13 coupled between the second input terminal 14 (–) and the first current source circuit 18 to provide protection against the application of line voltages for the other half cycle. The resistive network in an embodiment as shown may collectively provide sufficient impedance as to result in, for example, 2 W when 347 Vac is provided across the input terminals 12, 14. These figures are however merely exemplary and various alternative component configurations and values may further be anticipated to protect against the application of line voltages for both half-cycles within the scope of the present invention.

In an embodiment as shown, the first current source circuit 18 includes an integrated circuit U2 which operates as a low temperature coefficient (temperature compensated) shunt regulator and in combination with associated circuitry is effective to provide a fixed current (e.g., 200 uA) and a fixed voltage offset (e.g., 8.53 Vdc) on top of the input DC voltage Vin. An exemplary current source integrated circuit U2 may be a programmable three-pin shunt regulator diode TL431 as manufactured by Texas Instruments, and the technical data for which is incorporated herein by reference.

The second current source circuit 28 in such embodiments may further include an integrated circuit U1 having equivalent properties (e.g., the aforementioned TL431 integrated circuit) which in combination with associated circuitry is effective to cancel out the fixed voltage offset provided by the first current source circuit 18, resulting in an output voltage Vout which linearly tracks the input DC voltage Vin substantially independent of the temperature.

Figure 3:
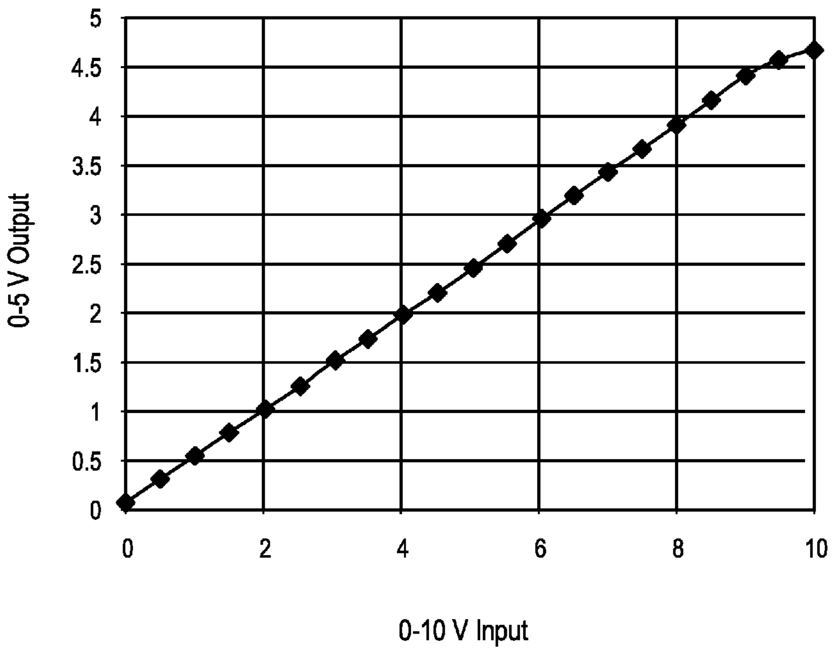
FIG. 3 is a graphical diagram representing output voltage with respect to input voltage for the interface circuit of FIG. 2.

Referring to FIG. 3, the linear conversion of input DC voltage Vin to output DC voltage Vout is represented in accordance with a circuit topology as shown in FIG. 2. As previously described, the composition of the first and second current source circuits 18, 28 may in various embodiments of the present invention be such that the linear conversion is temperature independent over a full rated temperature range.

Figure 4:
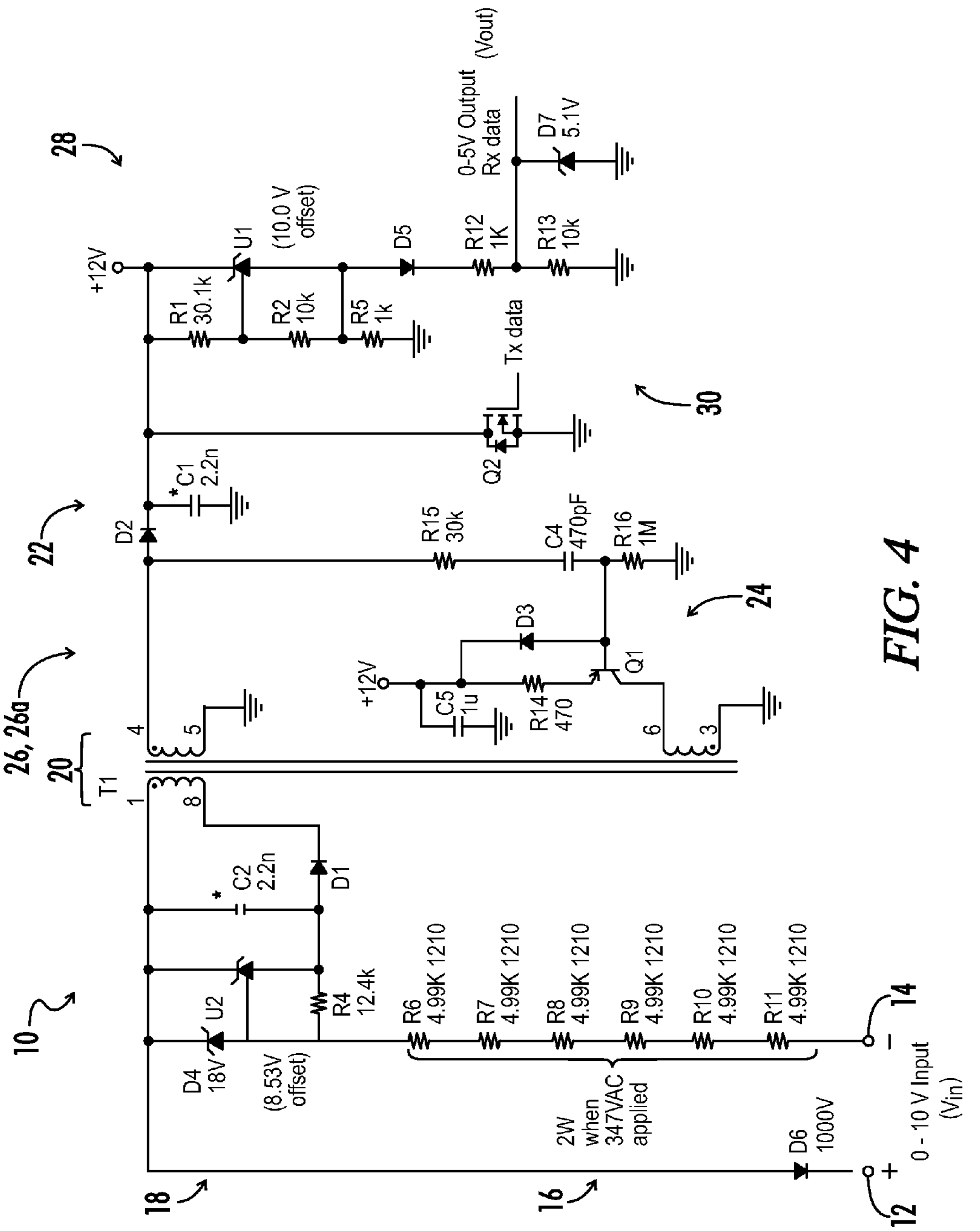
FIG. 4 is a circuit diagram representing another embodiment of the interface circuit of the present invention.

Referring now to FIG. 4, an alternative embodiment of the interface circuit 10 of the present invention may include a self-oscillating drive circuit 24 which as represented is a self contained circuit requiring no external drive signals in contrast to the drive circuit 24 of FIG. 2. The gate of the switching element Q1 is coupled via associated drive circuitry (e.g., capacitor C4 and resistors R15, R16) to the output stage 22 of the flyback converter circuit 26*a*.

Embodiments of the interface circuit 10 as represented in FIG. 4 may provide a transfer gain which is essentially independent of the supply voltage Vin, and which along with the DC offset (both of that provided by the first current source circuit and canceled out by the second current source circuit) may be adjusted to correspond with a typical electronic ballast application as is known in the art. In such embodiments, the input voltage (e.g., 0 Vdc to 10 Vdc) is substantially limited to a predetermined acceptable range (e.g., 1.5 Vdc to 7.5 Vdc). In other words, the input voltage is only linearly converted to an output voltage while the input voltage is within the predetermined supply range, substantially without regard for the scale of the input voltage wherein the same output is obtained for a 0-10 Vdc input as for a 0-12 Vdc or 0-14 Vdc input.

Figure 5:
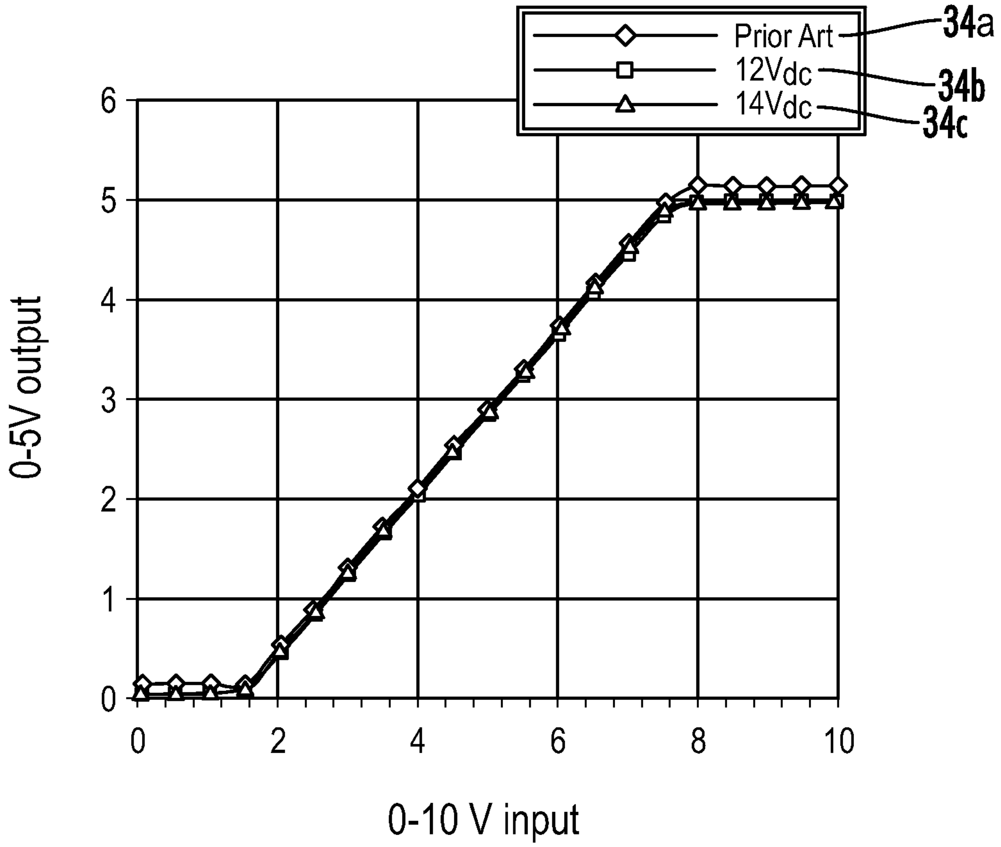
FIG. 5 is a graphical diagram representing output voltage with respect to input voltage for the interface circuit of FIG. 4.
Figure 6:
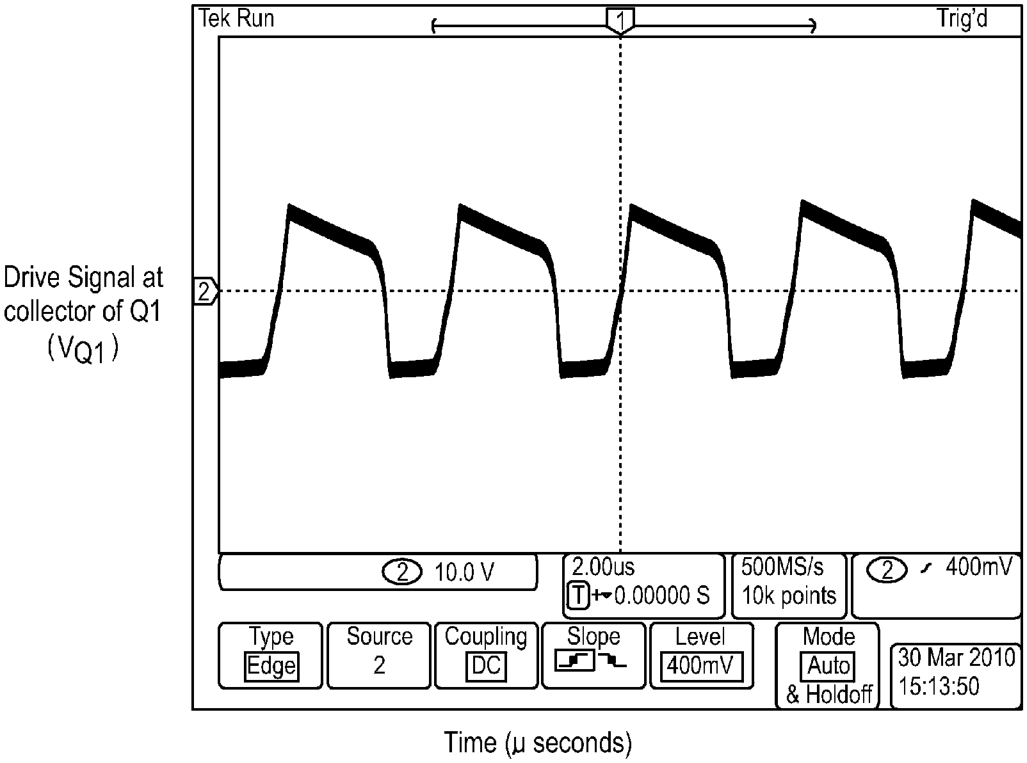
FIG. 6 is a graphical diagram representing a drive signal in the self-oscillating drive circuit of the interface circuit of FIG. 4.

With reference now to FIG. 5, the linear conversion of input DC voltage Vin to output DC voltage Vout within the predetermined acceptable range (in this case as above from 1.5 Vdc to 7.5 Vdc) is represented in accordance with a circuit topology as shown in FIG. 4. The performance of an electronic ballast having the interface circuit 10 of the present invention is charted alongside the performance of an electronic ballast having circuitry as previously known in the art (34*a*), with operation curve (34*b*) plotted in accordance with an input supply voltage Vin of 12 Vdc and operation curve (34*c*) plotted in accordance with an input supply voltage Vin of 14 Vdc. As described with respect to previous embodiments, the composition of the first and second current source circuits 18, 28 may also in embodiments as represented in FIG. 4 be such that the linear conversion is temperature independent over a full rated temperature range.

Various components in both of the first and second current source circuits 18, 28 vary in position or are removed/added entirely with respect to the embodiment represented in FIG. 2 and the embodiment represented in FIG. 4, including but not limited to diodes D1 in the first current source circuit 18, and D3, D7 in the second current source circuit 28. The positions shown are not intended as limiting upon the scope of the present invention however, and are merely exemplary unless otherwise stated or as required to accomplish various features of the present invention as may be understood by one of skill in the art.

As represented in FIG. 2 as well as in FIG. 4, capacitor C2 of the first current source circuit 18 and capacitor C1 of the output circuit 22 both have values of 2.2 nF. However, in various embodiments where the data communications circuitry and associated features are not necessary, larger values may desirably be provided.

The previous detailed description has been provided for the purposes of illustration and description. Thus, although there have been described particular embodiments of the present invention of a new and useful "Electronic Ballast with Protected Analog Dimming Control Interface," it is not intended that such references be construed as limitations upon the scope of this invention except as set forth in the following claims.

What is claimed is:

1. An interface circuit comprising:

first and second input terminals;

a line voltage protection circuit coupled to the first and second input terminals, the protection circuit effective to provide an input DC voltage across the first and second input terminals within a predetermined range, and further effective to prevent the application of an input line voltage across the first and second input terminals;

a first current source circuit coupled to the protection circuit, the first current source circuit effective as a fixed current source and further to generate a fixed voltage offset with respect to the input voltage;

an isolation circuit coupled to the first current source circuit;

a second current source circuit coupled to the isolation circuit, the second current source circuit effective to cancel out the fixed voltage offset generated by the first current source circuit, the first and second current source circuits collectively effective to provide a linear output DC voltage with respect to the input DC voltage, at least one of the first and second current source circuit comprising a low temperature coefficient circuit wherein the linear conversion of the input DC voltage to the output DC voltage is independent of the temperature throughout a predetermined operating range.

2. The circuit of claim 1, the protection circuit comprising a plurality of resistors coupled in series between one of the input terminals and the first current source circuit and effective to protect against line voltages during a first half-cycle, and further comprising a diode having its cathode coupled to the other of the input terminals and its anode coupled to the first current source circuit and effective to protect against line voltages during a second half-cycle.

3. The circuit of claim 1, the first current source circuit comprising a low temperature coefficient circuit further comprising a shunt regulator diode.

4. The circuit of claim 3, the second current source circuit also comprising a low temperature coefficient circuit further comprising a shunt regulator diode.

5. The circuit of claim 1, further comprising data communications circuitry effective to transmit and receive data signals across the first and second input terminals.

6. The circuit of claim 5, further comprising a first output terminal providing the output voltage with respect to a circuit ground and further comprising an Rx data communications terminal; and a second output terminal further comprising a Tx data communications terminal.

7. The circuit of claim 1, the isolation circuit comprising a first inductive winding coupled to the first current source circuit and a second inductive winding coupled to the second current source circuit, and effective to provide galvanic isolation between the first and second current source circuits.

8. An interface circuit comprising:

first and second input terminals;

a plurality of resistors coupled in series to the first input terminal and effective to protect against line voltages applied across the input terminals during a first half-cycle;

a diode having its cathode coupled to the second input terminal and effective to protect against line voltages applied across the input terminals during a second half-cycle, the plurality of resistors and the diode collectively further effective to provide an input DC voltage applied across the input terminals within a predetermined range;

a first current source circuit coupled to the resistors and the anode of the diode, the first current source circuit effective as a fixed current source and further to generate a fixed voltage offset with respect to the input voltage;

a flyback converter circuit comprising an input drive stage, an output stage and an isolation transformer having a first winding coupled to the first current source circuit, a second winding coupled to the output stage, and a third winding coupled to the input drive stage, the isolation transformer effective to provide galvanic isolation between the first current source circuit, the input drive stage and the output stage;

a second current source circuit coupled to the output stage of the flyback converter circuit, the second current source circuit effective to cancel out the fixed voltage offset generated by the first current source circuit, the first and second current source circuits effective to provide a linear output DC voltage with respect to the input DC voltage.

9. The circuit of claim 8, at least one of the first and second current source circuits comprising a low temperature coefficient circuit wherein the linear conversion of the input DC voltage to the output DC voltage is independent of the temperature.

10. The circuit of claim 8, the first and second current source circuits each further comprising a shunt regulator diode.

11. The circuit of claim 8, further comprising data communications circuitry effective to transmit and receive data signals across the first and second input terminals.

12. The circuit of claim 11, further comprising a first output terminal providing the output voltage with respect to a circuit ground and further comprising an Rx data communications terminal; and a second output terminal further comprising a Tx data communications terminal.

13. The circuit of claim 8, the drive input stage of the flyback converter circuit comprising a self-oscillating drive circuit.

14. An interface circuit for an electronic ballast comprising:

first and second input terminals;

a line voltage protection circuit coupled to the first and second input terminals, the protection circuit effective to provide an input dimming control voltage applied across the first and second input terminals, and further effective to prevent the application of an input line voltage applied across the first and second input terminals;

a first current source circuit coupled to the protection circuit, the first current source circuit effective as a fixed current source and further to generate a fixed voltage offset with respect to the input voltage;

an isolation circuit coupled to the first current source circuit;

a second current source circuit coupled to the isolation circuit, the second current source circuit effective to cancel out the fixed voltage offset generated by the first current source circuit, the first and second current source circuits effective to provide a linear output dimming control voltage with respect to the input voltage; and a self-oscillating drive circuit coupled to the isolation circuit and effective to drive the interface circuit without external control signals.

15. The circuit of claim 14, at least one of the first and second current source circuits comprising a low temperature coefficient circuit wherein the linear conversion of the input voltage to the output voltage is independent of temperature.

16. The circuit of claim 15, the first current source circuit having a transfer gain and offset effective to provide a first control voltage within a predetermined range.

17. The circuit of claim 16, the predetermined range comprising 1.5 Vdc to 7.5 Vdc, the second current source circuit effective to convert the first control voltage from 1.5 to 7.5 Vdc to a second control voltage from 0 to 5 Vdc.

18. The circuit of claim 17, the isolation circuit comprising a flyback converter circuit having a first inductive winding coupled to the first current source circuit, a second inductive winding coupled to the second current source circuit via an output stage, and a third inductive winding coupled to an input stage further comprising the self-oscillating drive circuit, the isolation circuit effective to provide galvanic isolation between the first current source circuit, the second current source circuit and the drive circuit.

* * * * *